Sept. 22, 1931.　　　　E. W. MILLER　　　　1,824,442
TRUING MEANS FOR HELICAL CUTTING TOOLS
Filed Aug. 31, 1928　　　3 Sheets-Sheet 1

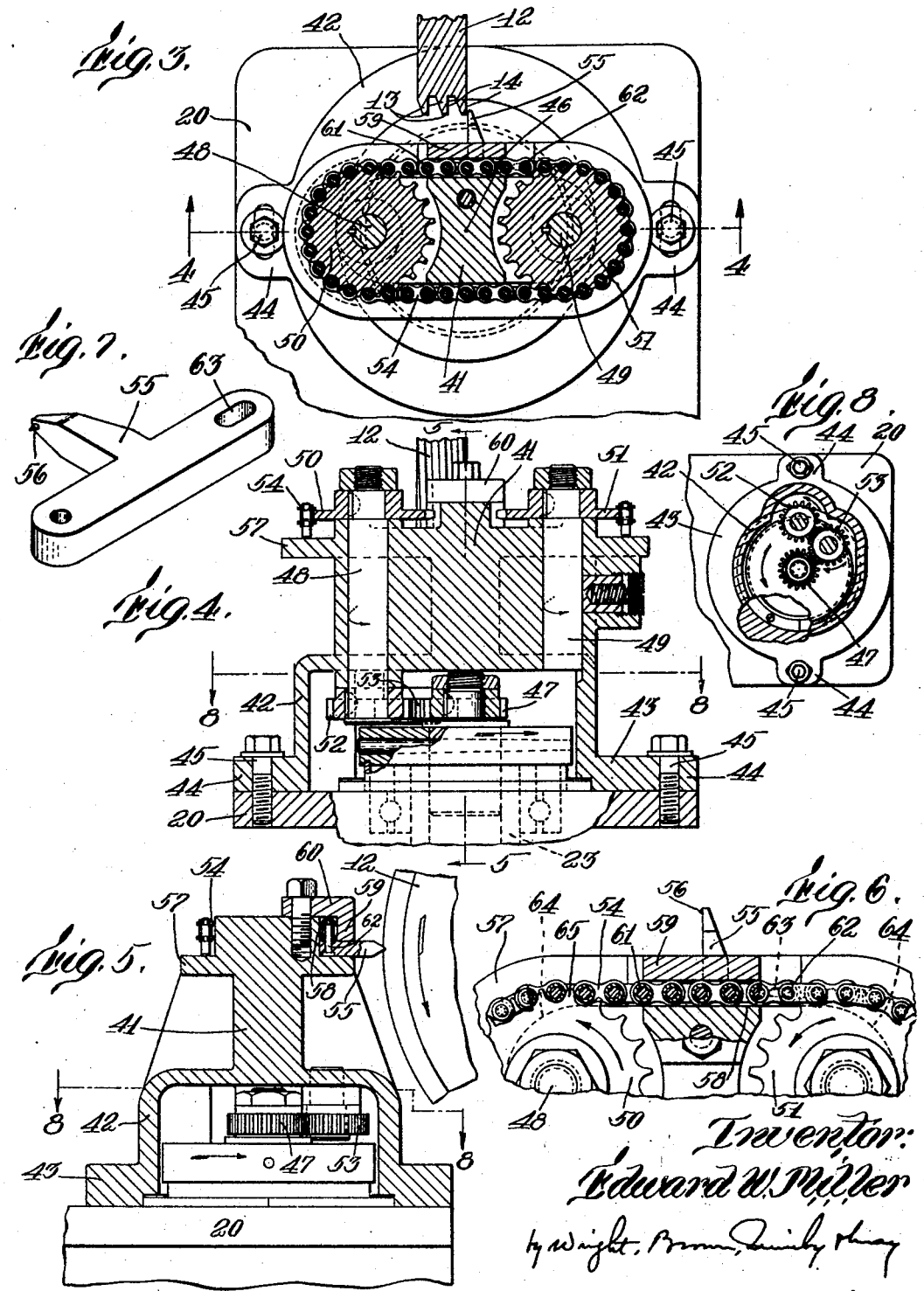

Patented Sept. 22, 1931

1,824,442

UNITED STATES PATENT OFFICE

EDWARD W. MILLER, OF SPRINGFIELD, VERMONT, ASSIGNOR TO THE FELLOWS GEAR SHAPER COMPANY, OF SPRINGFIELD, VERMONT, A CORPORATION OF VERMONT

TRUING MEANS FOR HELICAL CUTTING TOOLS

Application filed August 31, 1928. Serial No. 303,308.

This invention relates to means for bringing into true and accurate form, and good cutting condition, a helical tool adapted to cut gear teeth to finished size and form and generate their face curves in so doing. I have devised machines for so cutting and generating gear teeth by the use of helical abrading cutters and metal edged cutters. In the case of the abrading cutters, which may be emery wheels, metal laps adapted to cut with the agency of an applied abrasive, and the like, the cutting element is a helicoidal surface formed on one side of a rib located helically and peripherally of the work; and in the case of the metal cutting edged tool, the cutting element is a helical rib on the circumference of a tool made of suitable tool steel and having its cutting edge at the intersection between the periphery and one of the side faces of the rib.

Such tools are intended and designed to perform very accurate work in finishing the tooth faces of the gears on which they act, and to that end must themselves be accurate to the extreme limit of possibility. The provision of means for obtaining such accuracy is one of the major problems which I have encountered in developing gear finishing machines of the character above stated and one which I have solved in various ways. The truing means or device which I have illustrated and described in this specification embodies one of my solutions of this problem. It comprises a chain driven truing and sharpening tool for the cutting tool, together with means for adjusting the truing tool, not only for enabling the latter to act across the whole face of a helicoidal abrading wheel, but also for correcting the normal pitch of the helix in the cutting tool. The specific form of the present invention here illustrated is designed to true the helicoidal face of an abrading wheel, and is constructed as an attachment adapted to be applied to a gear grinding machine and to be driven by the work holding spindle thereof, but in its broader aspects and within the scope of my broader claims, the invention is not thus limited, but includes the application of the novel principles here embodied to truing and sharpening means for any type of helical cutter combined with any suitable supporting and driving means.

Referring to the drawings in which the above mentioned embodiment of the invention is illustrated,—

Fig. 1a is a fragmentary view showing part of the work spindle with a gear applied thereto in operative relation to the abrading wheel;

Fig. 3 is a sectional plan view on a larger scale of the wheel truing attachment; the plane of the section being indicated by line 3—3 of Fig. 1;

Fig. 4 is a vertical section of the truing attachment taken on line 4—4 of Fig. 3;

Fig. 5 is a vertical cross section taken on line 5—5 of Fig. 4;

Fig. 6 is a fragmentary view of a part of the mechanism shown in Fig. 3 but illustrating the latter on a larger scale;

Fig. 7 is a perspective of the traveler;

Fig. 8 is a horizontal section taken on line 8—8 of Figs. 4 and 5.

Like reference characters represent the same parts wherever they occur in all the figures.

Figure 1:
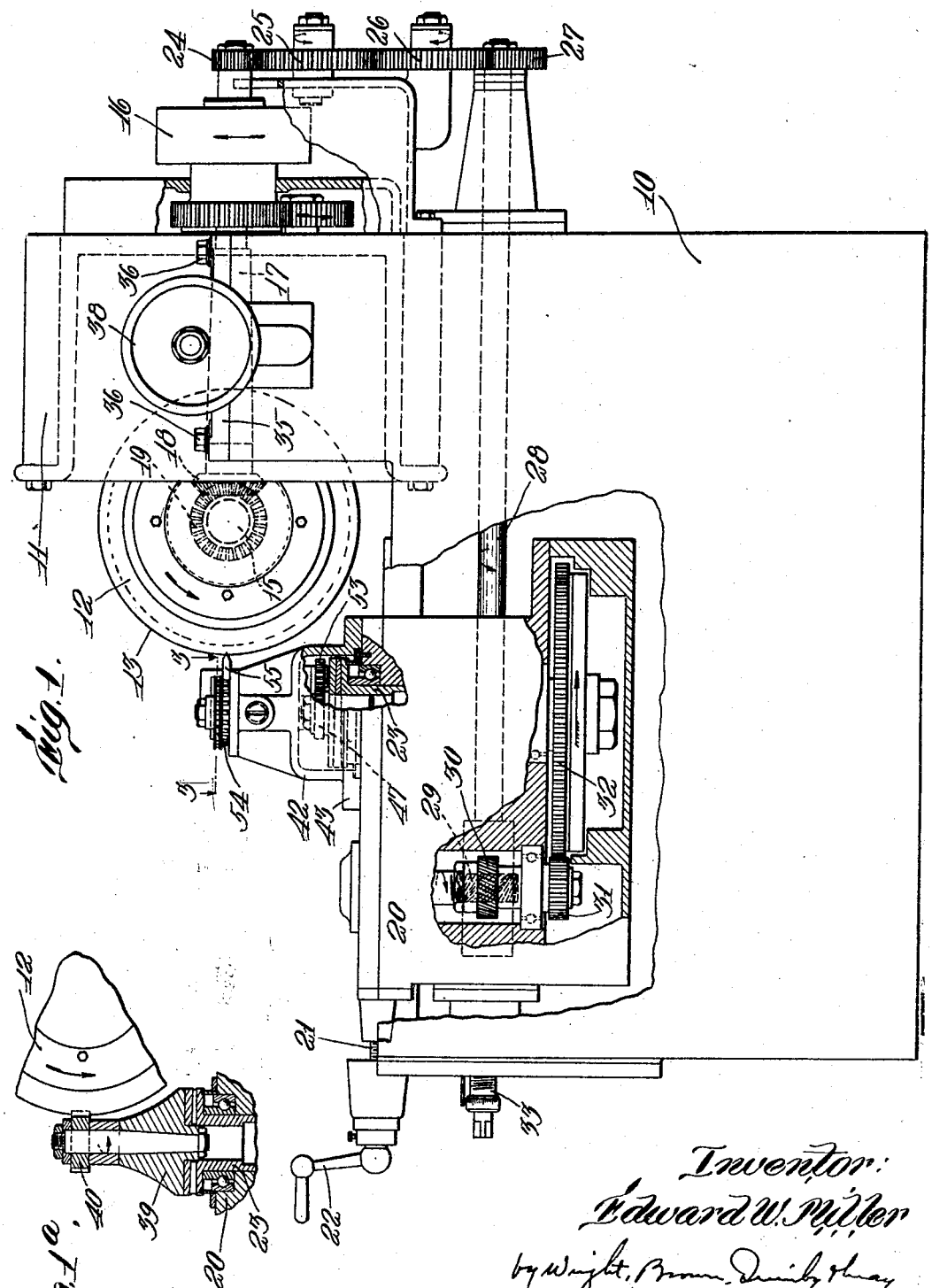
Fig. 1 shows in side elevation, but with parts broken away and illustrated in section, a gear grinding machine employing a helicoidal abrading wheel and having applied thereto as an attachment the wheel truing device of the present invention.

10 represents the base of the machine on which there is a rising head 11 carrying the gear generating tool 12, which in this instance is an emery wheel having a helical rib 13, as shown best in Fig. 3, the face 14 of which is the active abrading face and forms a helicoidal surface, the radial elements of which are perpendicular to the axis of the tool. The tool is mounted on a spindle 15 and is driven at suitable grinding speed by any suitable means, here represented as a belt pulley 16, acting through a shaft 17 and a bevel gear couple 18, 19.

Figure 2:
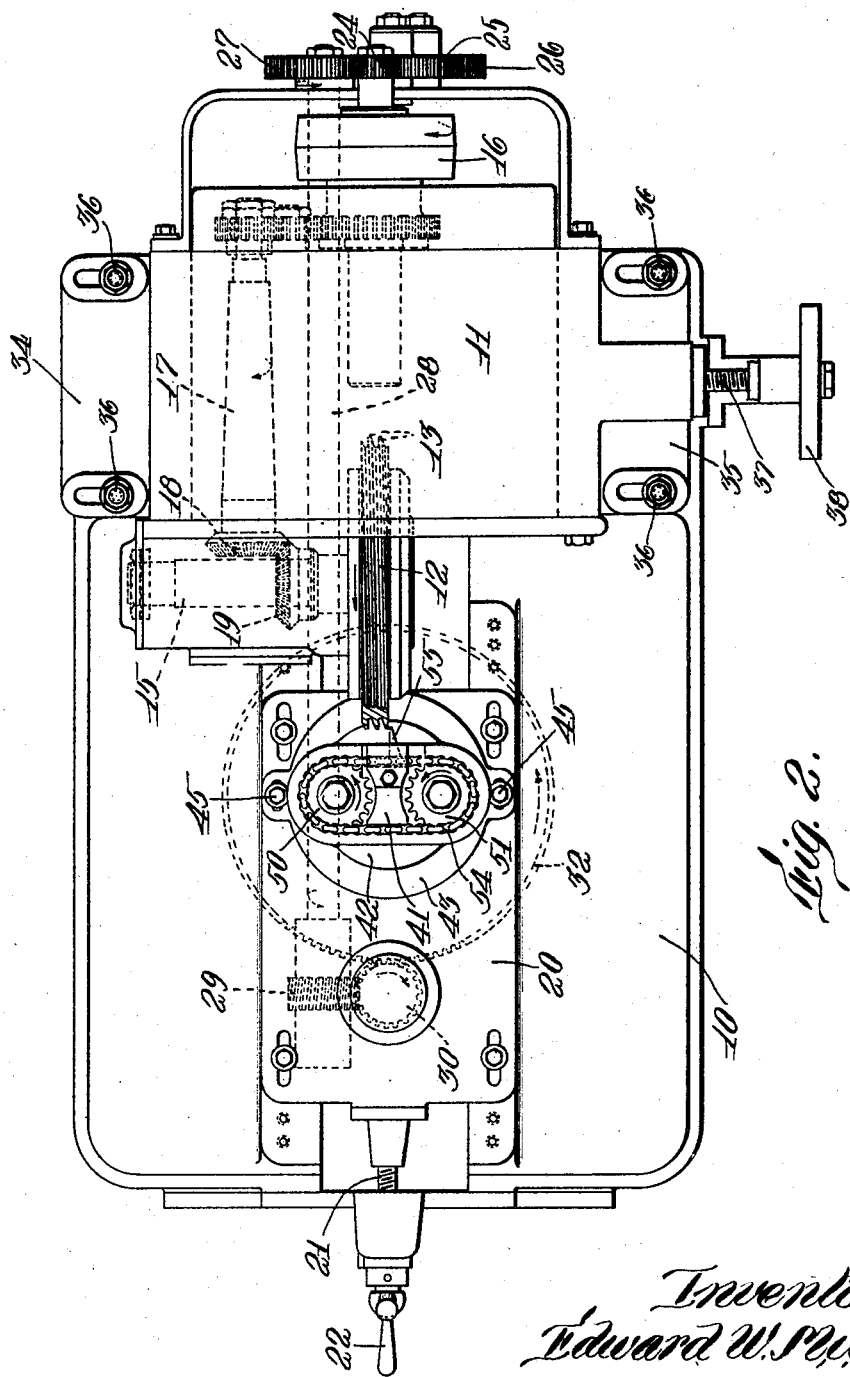
Fig. 2 is a plan view of the machine.

The base supports a work carriage 20 which is adjustable toward and away from the axis of the wheel by means of a screw 21 and an operating crank 22 therefor. In the carriage 20 is a work spindle 23 driven from the pulley 16 through a gear train 24, 25, 26 and 27, a shaft 28, a pair of helical gears 29 and 30, a pinion 31 on the same shaft with gear 30, and a large gear 32 fast to the work spindle and in mesh with pinion 31. A screw 33 serves to adjust the helical gear 29 endwise of shaft 28, with which it has a splined connection, whereby to give an angular adjustment to the work spindle. The head 11 carrying the grinding wheel is adjustable in the direction of the axis of the wheel, being provided with slotted lugs 34 and 35 through which the attaching bolts 36 pass, as shown in Fig. 2, and a screw 37 having a hand wheel 38 serves for adjusting it.

In the normal operation of the machine a work holder 39 is secured to the spindle 23, and the work piece 40 is mounted on the holder and rotated at a rate equal to the axial displacement of the helicoidal surface of the grinding wheel.

When the grinding wheel requires to be trued and dressed, the work holder is removed and the truing attachment substituted therefor. Such attachment comprises a holder 41 having a base part 42 formed as a circular housing which encloses the end of the work spindle and is adapted to rest on the upper surface of carriage 20, having a flange 43 at the bottom and slotted lugs 44 through which pass attaching bolts 45 threaded into the carriage. The slots in lugs 44 are concentric with the axis 46 of the holder, which is alined with the work spindle axis, whereby an angular adjustment of the holder is permitted for a purpose later described. A gear 47 is secured to the work spindle 23.

The holder is provided with parallel bearings in which are located shafts 48 and 49 having sprockets 50 and 51 respectively keyed and locked on their upper ends and resting on thrust bearings substantially as shown in Fig. 4. Shaft 48 also carries a keyed gear 52 meshing indirectly with the gear 47 through an idler 53 suitably supported by the holder. A sprocket chain 54 passes around the sprockets 50 and 51 and drives a traveler 55 which carries a diamond 56 or equivalent tool or bit capable of trimming the grinding wheel. From one point of view the diamond 56 may be considered the truing tool and the traveler 55 its carrier, but from the point of view of this specification the traveler and diamond together will be considered the truing tool of which the diamond is an inserted cutter.

A ledge 57 surrounding the upper part of the holder 41 supports the weight of the truing tool and forms one element of guiding means for controlling its path when traveling in action with the grinding wheel. The other elements of such guiding means are an upright surface 58 on the holder adjacent to the ledge 57 at the side next to the grinding wheel and an outer guide 59 having a lug 60 which rests on the holder and is suitably secured thereto. Between the guide 59 and the surface 58 is a passageway of sufficient width to receive and confine the chain; and between the lower edge of guide 59 and the ledge 57 is a space of sufficient width to receive and guide the projection on the truing tool or carrier which carries the cutting point. The base part of the truing tool is elongated so as to have a long bearing on the surface 58 to insure steadiness in the motion of the cutting point while traversing the grinding wheel. This base part near its ends is connected with two of the pivot pins, 61 and 62, of the chain, such pins being extended beyond the lower links of the chain for that purpose. Preferably also all the other pivots are similarly extended so as to travel on the ledge 57 and avoid sagging and distortion of the chain, thus giving a better control of the movement of the truing tool.

The opening in the truing tool for one of the connecting pivots, for instance the pivot 62, is a slot 63 provided to permit play of the pivot while the tool passes around the sprockets. As the base of the tool is rigid and straight and has the length of several link of the chain, it assumes the position of a chord of the pitch circle of the sprocket while the chain conforms more nearly to the circumference of the pitch circle. Hence the necessity of the play or lost motion just described. The pivot with respect to which such lost motion occurs should be the one which connects the following or rear end of the tool base to the chain, as here shown, in order to best to assure even movement of the tool while traversing the grinding wheel. Those parts of the surface 58 of the holder which surround the sprocket wheel shafts are eccentric to such shafts, as indicated by the dotted lines 64 in Fig. 6, in order to give room for the tool base to assume this chordal position.

In order further to control the movement of the truing tool, the driving sprocket 50 is formed with one tooth 65 wider than the others, and the number of teeth an exact divisor of the number of chain pivots. Hence the tooth 65 engages the same pivot in each circuit of the chain and insures traverse of the truing tool between exactly the same limits each time that it engages the same pivot. And the sprocket is so positioned that tooth 65 engages the chain before the cutting point comes into action on the face of the grinding wheel. As the other teeth of the sprocket are narrower than tooth 65 they do not have any tendency to advance the truing tool ahead of the position given it by the tooth 65. As the truing of the entire grinding wheel face is necessarily performed in a series of passes of the truing tool, owing to the narrow width of the diamond, it is important that the diamond be at the same point in its path at each traverse when on any given radial element of the surface of the grinding wheel, and the peculiar relationship of the sprocket wheel teeth just described insures this condition.

In using the form of the invention here shown, the holder 41 is substituted for the work holder 39 whenever the grinding wheel require truing. Power being applied to the machine, the truing tool is carried across the face of the grinding wheel in the same direction as the teeth of the work piece while being ground, and returns in a different path, repeatedly, while the grinding wheel is rotated in the normal way. This rotation is in the direction which causes the axial displacement of the helix to take place in the same direction as the movement of the nearer stretch of the chain. "Axial displacement" as here used means the component of the movement of the helix, with respect to a stationary point, which extends longitudinally of the axis of the cutting tool. The adjusting screw 37 may be operated if necessary to bring the abrading face of the wheel close to the diamond, and the adjuster 33 may be operated to give a fine increment of movement to the diamond, regulating the depth to which the diamond breaks or cuts away the surface of particles of the wheel. The adjuster 22 is operated to bring the path of the diamond within the periphery of the grinding surface and to shift the path successively between traverses of the diamond. Each of such traverses trues off a narrow strip or zone of the helicoidal surface, and successive adjustments cause these trued zones to merge into a surface as wide as necessary for the gear grinding purposes.

A further adjustment is made to correct the pitch of the helix by turning the truing tool holder about its axis 46, as permitted by the slots through which the clamping bolts 45 pass. Such adjustment causes the diamond to travel either in a path parallel to the axis of the grinding wheel or in a path more or less inclined to said axis. When in the parallel path its displacement along the axis during a rotation of the grinding wheel is the maximum, but when traveling in an inclined path its displacement along the axis is diminished in proportion to the angle of inclination. Thus the wheel may be trued with a longer or shorter pitch in order to correct the pressure angle of the gear teeth to be finished by the grinding wheel. Errors of this character may thus be corrected to a highly exact degree of accuracy.

A diamond is one form of truing element suitable for the special use of truing an emery wheel or similar tool made of agglomerated grains of hard material. Specifically different truing devices may be substituted, for operation by the same means and in the same way as described, when a specifically different cutting tool such as a metal lap or an edged helical cutter is used as the gear finishing tool. Hence it is to be understood that my protection is not limited to a diamond as the active element of the truing device, but includes equivalent truing cutters of specifically different characteristics suitable for other types of gear finishing helical cutters.

It is also to be understood that I am not limited to a chain as the propelling means for the truing tool but may use any of the equivalents of a chain for this purpose. Hence the term "chain" used in this specification is intended to include equivalent flexible or jointed propelling means as well as the specific chain here illustrated.

Neither is the invention limited to embodiment in an attachment for a grinding machine; for the same essential elements may be provided in an independent truing machine to which the gear finishing cutter is brought after removal from the gear finishing machine. Hence the machine which I have hereinbefore described as a gear grinding machine may be considered as representing and typifying in a broad sense a machine devised primarily for operating a truing device, regardless of other functions which it may have.

What I claim and desire to secure by Letters Patent is:

1. A means for truing a helical cutting tool, comprising a chain, a truing tool connected to said chain for propulsion thereby and guided to move in a path across the helix of said cutting tool, and means for so moving the chain and at the same time rotating the helical cutting tool about the axis of the helix.

2. A machine for truing and dressing a helical gear generating tool comprising a rotatable spindle to which said tool is made fast, a flexible endless traveling propeller mounted and guided for movement with one of its stretches adjacent to the periphery of said tool and approximately perpendicular to the radii of the helix at the adjacent side thereof, a truing tool connected to said propeller for propulsion thereby, and means for driving said propeller so that the stretch thereof adjacent to the first named tool travels simultaneously with the latter and in the same direction as the axial displacement of the helix thereof.

3. A truing apparatus comprising a truing tool guided to move in a prescribed path, means for mounting and rotating a helical cutter in a position such that its helix crosses said path, and means comprising a sprocket chain and wheels for propelling the truing tool in said path and returning it in a different path to the starting point.

4. A truing attachment for a metal cutting machine having a helical cutting tool, comprising a holder, sprocket wheels rotatably mounted on said holder, a sprocket chain passing about said wheels, a truing tool connected to said chain for propulsion thereby, and means for driving one of said sprocket wheels from a moving part of the machine.

5. A truing attachment for a metal cutting machine having a helical cutting tool, comprising a holder, sprocket wheels rotatably mounted on said holder, a sprocket chain passing about said wheels, a truing tool connected to said chain for propulsion thereby, and a gear connected with one of said sprocket wheels and adapted to be driven by a gear on the work spindle of the machine when the attachment is applied for use.

6. A truing attachment for a metal cutting machine having a helical cutting tool, comprising a holder, sprocket wheels rotatably mounted on said holder, a sprocket chain passing about said wheels, a truing tool connected to said chain for propulsion thereby, means for driving one of said sprocket wheels from a moving part of the machine, and means for guiding the truing tool in a prescribed path.

7. A truing attachment for a metal cutting machine having a helical cutting tool, comprising a holder, sprocket wheels rotatably mounted on said holder, a sprocket chain passing about said wheels, a truing tool connected to said chain for propulsion thereby, and means for driving one of said sprocket wheels from a moving part of the machine, one of said sprockets being a driver and having a special tooth arranged to engage the same pivot of the chain at each circuit of the latter in advance of the contact of following teeth with following pivots of the chain.

8. A truing apparatus for the purpose described comprising a holder having a guiding surface, a pair of sprockets rotatably mounted on said holder, a sprocket chain passing around said sprockets, one stretch of the chain being beside said guiding surface, and a truing tool having a base longer than one of the links of the chain engaged with two non-consecutive pivots of the chain, one of said pivots being contained in a slot in the truing tool base to permit the said base, when passing around the axis of either sprocket wheel, to assume a chordal position with respect thereto while the chain conforms more nearly to the circumference of the wheel.

9. A machine for truing a helicoidal surface on an abrading wheel comprising means for rotating such wheel about the axis of its helicoidal surface, a truing tool holder having guiding means arranged to constrain movement of the after mentioned truing tool in a path transverse to said helicoidal surface, rotatable driving and guiding sprockets, a sprocket chain passing around said sprockets and having one stretch extending beside said guiding means, a driving spindle coupled to the before mentioned driving sprocket for rotating the same, and a truing tool coupled to said chain for propulsion thereby and arranged to be guided in its movement by said guiding means.

10. A machine for truing a helicoidal surface on an abrading wheel comprising means for rotating such wheel about the axis of its helicoidal surface, a truing tool holder having guiding means arranged to constrain movement of the after mentioned truing tool in a path transverse to said helicoidal surface, rotatable driving and guiding sprockets, a sprocket chain passing around said sprockets and having one stretch extending beside said guiding means, a driving spindle coupled to the before mentioned driving sprocket for rotating the same, a truing tool coupled to said chain for propulsion thereby and arranged to be guided in its movement by said guiding means, and means for adjusting said guiding means toward and away from the axis of the abrading tool.

11. A machine for truing a helicoidal surface on an abrading wheel comprising means for rotating such wheel about the axis of its helicoidal surface, a truing tool holder having guiding means arranged to constrain movement of the after mentioned truing tool in a path transverse to said helicoidal surface, rotatable driving and guiding sprockets, a sprocket chain passing around said sprockets and having one stretch extending beside said guiding means, a driving spindle coupled to the before mentioned driving sprocket for rotating the same, a truing tool coupled to said chain for propulsion thereby and arranged to be guided in its movement by said guiding means, and means for effecting a relative adjustment between the abrading wheel and truing tool, additional to the chain propelled movement of the latter, in the general direction of the axis of the abrading wheel.

12. A machine for truing a helicoidal surface on an abrading wheel comprising means for rotating such wheel about the axis of its helicoidal surface, a truing tool holder having guiding means arranged to constrain movement of the after mentioned truing tool in a path transverse to said helicoidal surface, rotatable driving and guiding sprockets, a sprocket chain passing around said sprockets and having one stretch extending beside said guiding means, a driving spindle coupled to the before mentioned driving sprocket for rotating the same, a truing tool coupled to said chain for propulsion thereby and arranged to be guided in its movement by said guiding means, and means for inclining said guiding means relatively to the axis of the abrading wheel.

13. The combination with a machine having a rotatable abrading wheel formed with a helicoidal active face surrounding its axis, and a driving spindle, of a truing tool holder mounted on said machine with provision for angular adjustment about the axis of said spindle, complemental sprocket wheels mounted on said holder, one of which is in geared connection with said spindle to be rotated thereby, a sprocket chain passing around said sprocket wheels, and a truing tool connected to said chain for propulsion thereby.

14. The combination with a machine having a rotatable abrading wheel formed with a helicoidal active face surrounding its axis, and a driving spindle, of a truing tool holder mounted on said machine with provision for angular adjustment about the axis of said spindle, complemental sprocket wheels mounted on said holder, one of which is in geared connection with said spindle to be rotated thereby, a sprocket chain passing around said sprocket wheels, and a truing tool connected to said chain for propulsion thereby, said holder having guiding means for constraining the truing tool to travel in a prescribed path when nearest to the abrading wheel.

15. The combination with a machine having a rotatable abrading wheel formed with a helicoidal active face surrounding its axis, and a driving spindle, of a truing tool holder mounted on said machine with provision for angular adjustment about the axis of said spindle, complemental sprocket wheels mounted on said holder, one of which is in geared connection with said spindle to be rotated thereby, a sprocket chain passing around said sprocket wheels, and a truing tool connected to said chain for propulsion thereby, said holder having guiding means for constraining the truing tool to travel in a prescribed path when nearest to the abrading wheel, the spindle driven sprocket having a tooth with a relatively more advanced driving face than the other teeth arranged to engage the chain while the truing tool traverses the face of the abrading wheel in operative relationship therewith.

In testimony whereof I have affixed my signature.

EDWARD W. MILLER.